UNITED STATES PATENT OFFICE.

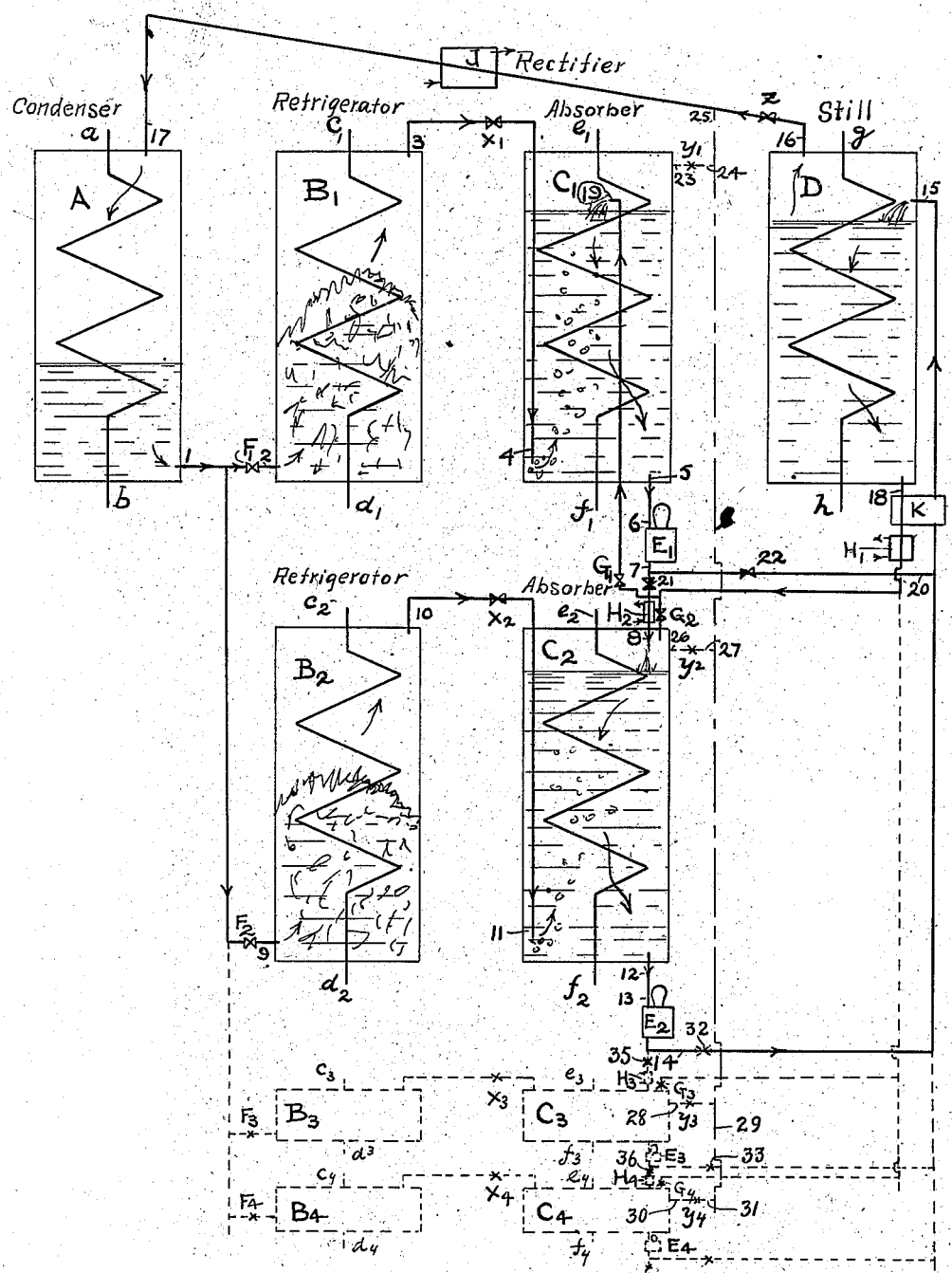

GARDNER TUFTS VOORHEES, OF BOSTON, MASSACHUSETTS.

MULTIPLE-EFFECT ABSORPTION REFRIGERATING SYSTEM.

932,657.  Specification of Letters Patent.  Patented Aug. 31, 1909.

Application filed February 3, 1906. Serial No. 299,320.

*To all whom it may concern:*

Be it known that I, GARDNER T. VOORHEES, a citizen of the United States of America, residing at Boston, in the county of Suffolk and State of Massachusetts, have invented certain new and useful Improvements in Multiple-Effect Absorption Refrigerating Systems, of which the following is a specification.

My invention relates to improvements in methods of refrigeration and in absorption refrigerating apparatus adapted to carry out my improved method.

It is often desired to do refrigerating by taking up heat at two or more different planes of temperature. Such refrigeration has been done in the past either by taking up the heat at the lower plane of temperature or by employing as many different refrigerating machines as there are planes of temperature. The first of these methods of taking up heat at the lower plane requires excessively large apparatus and is uneconomical, while the second of these methods is more expensive in first cost but is more economical in operation.

My new refrigerating system consists of an absorption apparatus having two or more sets of refrigerators and absorbers arranged to maintain different pressures in the refrigerators and absorbers so that the refrigeration may be done at two or more planes of temperature without requiring a complete absorption machine for each plane of temperature. The different pressures in the refrigerators and absorbers are controlled by the temperature and per cent. of strength of the absorbent in the absorbers. For a given absorber temperature a low absorber pressure requires a less strength of absorbent than does a higher absorber pressure. Low temperature in the refrigerator requires less absorber pressure than does high temperature in the refrigerator; and when the absorbent in an absorber is saturated with gas at a low pressure it will still have a capacity even at a higher temperature, to absorb more gas at a higher pressure.

In general, in an absorption ammonia system embodying my invention, aqua ammonia from a single still by being exposed *seriatim* to ammonia gas in a series of absorbers, each absorber being at a higher pressure than the absorber before it in the circuit, can *seriatim* absorb more and more ammonia gas and become resaturated in each absorber; or, alternatively, the several absorbers may be fed with weak liquor separately while nevertheless effecting absorption simultaneously at different pressures.

Apparatus for carrying out my said method may comprise a plurality of refrigerators (using that term in its technical sense and not in its specific household sense) maintained at different temperatures, and therefore adapted to effect evaporation of the refrigerating medium at different pressures; a plurality of absorbers, constituting in effect a single multi-stage absorber, the several stages of such absorber being adapted to be maintained at different pressures and each such stage being connected to a corresponding refrigerator, the pressure in the absorber stage or section to which each particular refrigerator is connected, determining the pressure at which evaporation is effected in that refrigerator; a still; and a condenser by means of which the refrigerating medium evaporated in said still may be condensed to a liquid; together with suitable pipe connections, valves, and auxiliary devices such as are customary in absorption refrigerating apparatus. Or, instead of having a separate still, the absorber itself may, according to a method well known, serve as a still, being operated alternately as an absorber and as a still, and being termed hereinafter for that reason an "absorber still," and this method of operation is referred to hereinafter as the "intermittent method."

Preferably, during absorption, the liquor which has absorbed gas in the lowest pressure stage of the absorber, is passed to that stage of the absorber in which the next higher pressure is maintained, and so on; though if preferred the several stages of the absorber may be connected in parallel to the still so that different portions of the weak liquor from the still may pass through the several absorber stages and may be discharged thence into the still from the several absorber stages separately.

In the accompanying diagrammatic drawing full lines represent the apparatus employed in a two stage apparatus and dotted lines represent additional apparatus used when more than two stages are used. The dot and dash line represents an additional conduit used when the apparatus is operated according to the intermittent method referred to.

A is a condenser having a cooling water coil $ab$; $B^1$, $B^2$, $B^3$, $B^4$ are refrigerators having brine coils $c^1 d^1$, $c^2 d^2$, $c^3 d^3$ and $c^4 d^4$ respectively; $C^1$, $C^2$, $C^3$, $C^4$, are absorbers, or combined absorbers and stills, constituting, when employed as absorbers, a single multi-stage absorber, having coils $e^1 f^1$, $e^2 f^2$, $e^3 f^3$ and $e^4 f^4$ respectively; D is a still having a steam coil $g h$; $E^1$, $E^2$, $E^3$, $E^4$ are liquor pumps; $F^1$, $F^2$, $F^3$, $F^4$ are expansion valves; $G^1$, $G^2$, $G^3$, $G^4$ are weak liquor regulating valves; $H^1$, $H^2$, $H^3$, $H^4$ are liquor coolers adapted for circulation through them of cooling water, and so constructed that hot liquor may pass through a pipe coil immersed in cooling water, to cool the liquor. J is a rectifier arranged for cooling water circulation, so constructed that in an aqua ammonia system vapors of water and ammonia, passing through a pipe coil immersed in water, will be rectified of water vapor, so that ammonia vapor will pass on to the condenser while the condensed water vapor with some re-absorbed ammonia, flows back to the still. K is an exchanger to transfer heat from hot liquor to cold liquor, so constructed that hot liquor flowing through a pipe coil immersed in cold liquor will be cooled, and the cold liquor will be heated.

$H^1$, $H^2$, $H^3$, $H^4$, J and K may or may not be used as is desired. The conduits 17—25, and 25—24—27—29—31 are used to conduct gas from $C^1$, $C^2$, $C^3$, $C^4$ etc., to the condenser A when the system is operated as an intermittent system, and when still D is not in use and $C^1$, $C^2$, $C^3$ and $C^4$ are operated as absorber stills.

With valves $F^2$, $F^3$, $F^4$, 21, $G^2$, $G^3$, $G^4$, $y^1$, $y^2$, $y^3$, $y^4$, 32, 33, 34 shut, and valves $F^1$, $X^1$, $G^1$, 22 and Z open then condenser A, refrigerator $B^1$, absorber $C^1$, still D and pump $E^1$ will operate as an ordinary continuous process absorption machine; or if still D is cut out of the system by closing valves $G^1$ and Z, and pump $E^1$ is not operated, then A, $B^1$ and $C^1$ will operate as an ordinary intermittent absorption machine, in which, by first opening valves $F^1$ and $X^1$ and shutting valve $y^1$ and circulating cooling water through coil $e^1 f^1$, $C^1$ will operate as an absorber; and then by closing valves $F^1$ and $X^1$ and opening valve $y^1$ and circulating steam through coil $e^1 f^1$, $C^1$ will operate as a still and ammonia gas will be distilled from the absorbent in it into condenser A.

If valves 22, 33, 34, $y^1$, $y^2$, $y^3$, $y^4$, $G^2$, $G^3$, $G^4$, $F^3$ and $F^4$ are shut, and valves $F^1$, $F^2$, $X^1$, $X^2$, 21, 32, Z and $G^1$ are open, the apparatus as shown in full lines will operate, as my new apparatus, in two stages, in its preferred method, the operation being as follows,—Liquid ammonia flows from condenser A through pipes 1, 2 and 9, and through expansion valves $F^1$ and $F^2$, to refrigerators $B^1$ and $B^2$. The liquid ammonia is evaporated in refrigerator $B^1$, by heat from coil $c^1 d^1$, at say 5 lbs. per square inch gage pressure; while the liquid ammonia is evaporated in refrigerator $B^2$ by heat from coil $c^2 d^2$ at say 10 lbs. pressure. The ammonia gas from refrigerator $B^1$ passes through pipe 3—4 into absorber $C^1$, where it meets weak aqua ammonia, and is absorbed thereby at say 4 lbs. gage pressure; the heat liberated during absorption being taken out by water circulated through coil $e^1 f^1$. The ammonia gas from refrigerator $B^2$ passes through pipe 10—11 to absorber $C^2$, where it meets medium strength aqua ammonia and is absorbed thereby at say 9 lbs. pressure, the heat liberated being taken out by water circulated through coil $e^2 f^2$. The medium strength aqua ammonia from absorber $C^1$ is pumped through pipe 5—6 by pump $E^1$ and through pipe 7—8 to absorber $C^2$ and is then pumped from absorber $C^2$ by pump $E^2$, as strong liquor, through pipes 12—13 and 14—15 to still D. In still D the aqua ammonia is heated by steam circulated through coil $g$—$h$; and the ammonia gas therefrom distilled flows through pipe 16—17 to condenser A wherein it is condensed by the cooling action of water circulated through cooling coil $ab$; the weak aqua ammonia flowing from the still D through pipe 18—19 and through a weak liquor regulating valve $G^1$ to absorber $C^1$, so completing the cycle of operation; which cycle is continuously repeated during the operation of the apparatus as described.

In the above described preferred method of operation the aqua ammonia from absorber $C^1$ is pumped by pumps $E^1$ and $E^2$ to the still D by way of the absorber $C^2$; but if desired the aqua ammonia from absorber $C^1$ may be pumped direct to still D and weak liquor may be supplied to absorber $C^2$ direct from still D, and the liquor from absorber $C^2$ may be pumped direct to still D. To do this valve 21 is closed and valves 22 and $G^2$ are opened, and the aqua ammonia direct from the still flows through the absorbers in parallel, In a two stage intermittent system the operations of all parts of the system are much the same as in the continuous system except that $C^1$ and $C^2$, then used as absorber-stills, intermittently perform the function of the absorbers and the still of the continuous system; cooling water being first passed through the coils $e^1 f^1$, $e^2 f^2$, until absorption is complete, and then steam is passed through these coils until distillation has been carried as far as desirable, so that $C^1$ and $C^2$ alternately act as two absorbers and then as two stills.

It will be clear from the above, to those skilled in the art, how a third stage, with say 20 lbs. pressure in refrigerator $B^3$ and say 19 lbs. pressure in absorber $C^3$, may be added to the two stage system just above described, and how a fourth stage with say 30 lbs. pressure in refrigerator $B^4$ and say 29 lbs. pressure in absorber $C^4$, may be added to the three stage system, and how any other number of sets of refrigerators and absorbers or refrigerators, absorbers and pumps can be added to the four stage system. The different pressures in the refrigerators are obtained by so regulating the expansion valves $F^1$, $F^2$, $F^3$, $F^4$ etc., that only sufficient ammonia is fed into the refrigerators from the condenser to maintain the desired pressure in each refrigerator. The regulation of these expansion valves and the regulation of the quantity of liquor pumped by the pumps $E^1$, $E^2$, $E^3$, $E^4$, etc., and the regulation of the weak liquor valve or valves govern the pressures in the absorbers. As appears from the above description, when the absorbers are operated in series, only valve $G^1$ of the weak liquor valves will be open and will require regulation; but when the absorbers are operated in parallel one or more of valves $G^2$, $G^3$ and $G^4$ will be open (according to the number of absorbers in use) and may require regulation.

I believe the above described method of refrigeration and refrigerating apparatus to be new and novel and I wish to claim it in the broadest possible manner. It will be obvious that by my improved method and apparatus, much less apparatus is required than when refrigeration at a number of different temperature planes is conducted according to the prior methods referred to early in this specification, and that there is a great saving in cooling water and steam used, as well as great saving in first cost of apparatus. Since other refrigerating mediums beside ammonia are well known to be adapted for use in absorption systems, I do not limit myself to the use of ammonia. Although I call $E^1$, $E^2$, $E^3$, $E^4$, etc., liquor pumps I do not wish it to be understood that these pumps pump nothing but liquor for it may often be the case that they pump liquor containing a considerable quantity of unabsorbed ammonia gas and in the claims when I refer to them as liquor pumps I mean pumps that pump the liquor from the absorbers that may contain the gas from the refrigerators as all or only partly absorbed in it.

What I claim is:—

1. In an absorption refrigerating system a condenser, a liquid conduit therefrom to a low pressure refrigerator, a low pressure refrigerator, a gas conduit therefrom to a low pressure absorber, a low pressure absorber, a liquor conduit therefrom to a high pressure absorber, a liquor pump in said conduit, a high pressure absorber, a liquid conduit from the condenser to a high pressure refrigerator, a high pressure refrigerator, a gas conduit therefrom to the high pressure absorber, a liquor conduit therefrom to a still, a liquor pump in said conduit, a still, a gas conduit therefrom to the condenser and a liquor conduit from the still to the low pressure absorber.

2. In an absorption refrigerating system a condenser, a liquid conduit therefrom to a low pressure refrigerator, a low pressure refrigerator, a gas conduit therefrom to a low pressure absorber, a low pressure absorber, a liquor conduit therefrom to the still, a liquor pump in said conduit, a still, a liquid conduit from the condenser to a high pressure refrigerator, a high pressure refrigerator, a gas conduit therefrom to a high pressure absorber, a liquor conduit therefrom to the still, a liquor pump in said conduit, a high pressure absorber, a gas conduit from the still to the condenser and a liquid conduit from the still to the high and low pressure absorbers.

3. In a refrigerating apparatus the combination of a plurality of refrigerating lines, and an absorber having different connected portions, in which different pressures are maintained, said refrigerating lines each frigerating lines conected to said absorber the pressure of which approximates the pressure in said line.

4. In a refrigerating apparatus the combination with an absorber having different connected portions in which different pressures are maintained, of means for maintaining a plurality of different planes of temperature comprising a plurality of refrigerating lines connected to said absorber at points where the pressures are different.

5. In refrigerating apparatus, the combination with an absorber having different connected portions in which different pressures are maintained, of means for maintaining a plurality of different planes of temperature comprising a plurality of refrigerating lines connected to said absorber at points where the pressures are different, the direction of flow of the liquor in said absorber being from that portion of the absorber in which the lower pressure is maintained toward the portion of the absorber in which the highest pressure is maintained.

6. In refrigerating apparatus, the combination with an absorber comprising a plurality of absorption vessels in which different pressures are maintained, and means for conducting the absorbing liquor from one to the other, of a plurality of refrigerating lines in which different pressures are to be maintained, each connected to the absorption vessel the pressure of which approximates the pressure to be maintained in such line.

7. In an absorption refrigerating system, the combination of distilling apparatus, means for condensing the refrigerating agent distilled therein, a supply line for supplying refrigerating medium from the condensing means, a plurality of refrigerating lines connected thereto, absorption apparatus in different portions of which different pressures are maintained, and means for conducting weak liquor from the still to said absorption apparatus and for conducting strong liquor from said absorption apparatus back to the still, said refrigerating lines each connected to the portion of said absorption apparatus the pressure of which approximates the pressure to be maintained in refrigerating line.

8. In an absorption refrigerating system, the combination of distilling apparatus, means for condensing the refrigerating agent distilled therein, a supply line for supplying refrigerating fluid from the condensing means, an absorber, a plurality of refrigerating lines connected thereto at points where the pressures are different and connected to the supply line, whereby a plurality of different planes of temperature may be maintained, and means for conveying weak liquor from the still to said absorber and for conveying strong liquor from the absorber to the still.

9. The herein described method of effecting refrigeration which consists in simultaneously expanding different portions of a refrigerating fluid to different pressures, and then simultaneously absorbing such different portions of such fluid so expanded in different portions of an absorbing liquid while the latter are subjected each to the pressure to which the corresponding portion of said refrigerating fluid was expanded, the absorbing liquid being subjected successively to the different portions of the expanded refrigerating fluid in order of their pressures.

10. The herein described method of effecting refrigeration, which consists in simultaneously expanding different portions of a refrigerating fluid to different pressures, and then simultaneously absorbing such different portions of such fluid so expanded in different portions of an absorbing liquid while the latter are subjected each to the pressure to which the corresponding portion of said refrigerating fluid was expanded, the absorbing liquid being subjected successively to the different portions of the expanded refrigerating fluid in the order of their pressures, and then distilling off and compressing such refrigerating fluid.

In testimony whereof I affix my signature in presence of two witnesses.

GARDNER TUFTS VOORHEES.

Witnesses:
H. CHAPMAN,
GEO. M. BURRELL.